United States Patent [19]

Lahalih et al.

[11] Patent Number: 4,845,888

[45] Date of Patent: Jul. 11, 1989

[54] MULTILAYER DEGRADEABLE AND CONTROLLED RELEASE MULTINUTRIENT MULCH FILM, AND PROCESS FOR PREPARING SAME

[75] Inventors: Shawqui Lahalih, Rique; Saed-El-Deen Akashah; Farouk Al-Hajjar, both of Jabriaya, all of Kuwait

[73] Assignee: Kuwait Institute for Scientific Research, Safat, Kuwait

[21] Appl. No.: 71,366

[22] Filed: Jul. 9, 1987

[51] Int. Cl.[4] ............................................. A01G 7/00
[52] U.S. Cl. ......................................... 47/9; 428/518; 71/28; 71/903; 71/3; 71/64.11
[58] Field of Search .......................... 47/9; 71/28, 903

[56] References Cited

U.S. PATENT DOCUMENTS 4,686,790  8/1987  Lahalih et al. ............................ 47/9

Primary Examiner—Ferris H. Lander
Attorney, Agent, or Firm—Bacon & Thomas

[57] ABSTRACT

A degradable agricultural mulch film as disclosed herein includes a plurality of layers for the controlled release of plant nutrients. The first layer is formed from a water-soluble synthetic resin, a releasable form of nitrogen and a releasable form of a plant nutrient in addition to nitrogen. A second layer includes a water-soluble synthetic resin having an average molecular weight which is greater than the average molecular weight of the water-soluble synthetic resin in the first layer and a releasable form of nitrogen admixed therein. The second layer also includes a thin film of water-resistant polymer to retard the degradation rate of the second layer and to slow the release of nitrogen in the second layer. And in the preferred embodiment of the invention a second film of water-resistant polymer which is relatively thin with respect to the first film separates the first and second layers.

41 Claims, No Drawings

MULTILAYER DEGRADEABLE AND CONTROLLED RELEASE MULTINUTRIENT MULCH FILM, AND PROCESS FOR PREPARING SAME

BACKGROUND OF THE INVENTION

This application relates to a degradable agricultural mulch film which includes slowly released multi-nutrients in a matrix of thermoplastic resin material. The application relates more particularly to a multilayer mulch film in which the release of the multinutrients is time controlled to provide the optimal amount of nutrient at the various stages of plant growth. The application also relates to a method for preparing the mulch film disclosed herein.

Agricultural much films are used extensively throughout the world because of the many advantages they provide, including retarded weed growth, increased soil retention of moisture and heat, and reduced soil erosion by winds and rain. Such mulching films also enhance soil structure by preventing soil crusting and soil compaction.

In our co-pending U.S. patent application Ser. No. 792,656, now U.S. Pat. No. 4,686,790, Aug. 18, 1987 we disclose a plastic mulchc film which has good mechanical properties, clarity, the ability to retard weed growth without the use of herbicides or black pigments, degradability, the incorporation of nutritional materials, slow release characteristics and which is safe for the environment and ecology because it does not include toxic chemicals. That film disintegrates over the course of a growing season and releases the necessary nutritional value to plants in a controlled manner.

In essence, the plastic mulch film disclosed in the aforementioned application includes first film formed from a water-soluble synthetic resin such as a polyvinyl alcohol having admixed therein at least one releasable form of nitrogen and at least one releasable plant nutrient in addition to nitrogen and, a second film is formed as an adherent coating on the first film. The second film comprises a water-resistant resin such as a polyvinyl acetate which functions to retard the degradation of the mulch and thereby slows the rate of release of the nutrients.

The use of slow release nutritional mulch films as described above have resulted in earlier crop harvest, better vegative growth, increased yield, reduced weed growth, and less temperature build up. However, it has been found that such films do not provide the optimal amount of nutrients during the various stages of plant growth.

For example, Hunter Johnson, Jr. and Gary W. Hickman reported in a publication of the University of California, leaflet 2775 on Greenhouse Cucumber Production that cucumbers require only part of the total nitrogen (N) needed and most of the needed phosphorous ($P_2O_5$) and potassium ($K_2O$) in the preemergent or preplanting stage. Specifically, they reported that during the preemergent stage, cucumbers require 5.7 grams per square meter ($gm/m^2$) nitrogen (N), 17 $gm/m^2$ phosphorous ($P_2O_5$) and 28 $gm/m^2$ potassium ($K_2O$). Then during the first few weeks of growth and prior to fruiting approximately 3.4 $gm/m^2$ of nitrogen is needed. And then, during the weeks of fruiting, approximately 25.0 $gm/m^2$ of nitrogen is needed.

Similar studies indicate that different crops require different nutrient doses at different stages of their growth cycle. For example, the following schedule for fertilization have been suggested:

Wittwer and Honma (1979) reported a fertilizer program for greenhouse early spring tomatoes that received preplanting and supplement fertilizer applications. The program is represented in the following table.

| Stages of growth | $gm/m^2$ N | $P_2O_5$ | $K_2O$ |
| --- | --- | --- | --- |
| Preplanting (manure) | 113.6 | 56.8 | 113.6 |
| 0-113 days | 31.7 | 50.2 | 66.4 |
| 113-147 days | 35.1 | — | 45.0 |

However, Thompson and Kelly (1957) and Villareal (1980) recommended another fertilizer program that can be applied to the soil for tomatoes. This program can be summarized as follows:

| | $gm/m^2$ N | | $P_2O_5$ | | $K_2O$ | |
| --- | --- | --- | --- | --- | --- | --- |
| Stages of growth | 1* | 2** | 1 | 2 | 1 | 2 |
| Preplanting | 5.7–11.4 | 4.0 | 9.1–18.2 | 15.0 | 6.8–13.6 | 6.0 |
| Growth | 5.7–11.4 | 4.0 | — | — | — | — |
| Fruiting | 5.7–11.4 | 4.0 | — | — | — | — |

*1 Thompson and Kelly;
**2 Villareal

Similar to the greenhouse tomato, the cucumber requires a proper balance of nutrients to produce a good crop. Wittwer and Hornma (1979) suggested a weekly fertilizer schedule for greenhouse cucumber which can be represented as follows:

| Stages of growth | $gm/m^2$ N | $P_2O_5$ | $K_2O$ |
| --- | --- | --- | --- |
| 1-3 weeks | 4.8 | 3.4 | 7.5 |
| 4-10 weeks | 29.0 | 6.8 | 21.1 |
| 11-18 weeks | 47.7 | 8.0 | 24.7 |

The highest yield of corn is obtained on heavily fertilized land. Usually, part of the nitrogen is applied in a mixed fertilizer during or before planting and a second application follows about 20 to 30 days after emergence of seedling. The suggested fertilizer program for corn is represented as follows:

| Stages of growth | $gm/m^2$ N | $P_2O_5$ | $K_2O$ |
| --- | --- | --- | --- |
| Preplanting | 11.36–17.1 | 8.5 | 11.36 |
| Growth | 11.36–17.1 | 8.5 | 11.36 |

Beans are legume, and for many years only phosphorous and potash were used in fertilizer. Thompson and Kelly (1957) recommended to use the following fertilizer application for beans.

| Stages of growth | $gm/m^2$ N | $P_2O_5$ | $K_2O$ |
| --- | --- | --- | --- |
| Preplanting | 10.5–21.0 | 66–99 | 27–54 |

-continued

| Stages of growth | gm/m² N | P₂O₅ | K₂O |
| --- | --- | --- | --- |
| Growth | 10.5–21.0 | 66–99 | 27–54 |

Thompson and Kelly (1957) also reported a fertilizer program for eggplants which can be represented as follows:

| Stages of growth | gm/m² N | P₂O₅ | K₂O |
| --- | --- | --- | --- |
| Preplanting | 11.4 | 17.1 | 17.1 |
| Growth stage | 2.3–4.6 | — | — |

While the mulch film, and others disclosed in our copending applications, have been used with some degree of success, no plastic mulch film has been found which combines an adequate balance of the important properties needed and at the same time provides an optimal amount of nutrients to a crop during the various stages of plant growth.

SUMMARY OF THE INVENTION

The self-supporting, composite, degradable agricultural mulch films according to the present invention have a number of important properties. For example, the mulch films have good mechanical properties, clarity, the ability to retard weed growth without the use of herbicides or black pigments, degradability, the incorporation of nutritional materials, slow release of nutritional materials and safety to the environment and ecology by excluding the addition of toxic chemicals.

In addition, the agricultural mulch can be tailored to a specific crop so that the optimal amount of specific nutrients will be applied to the crop during the various stages of plant growth. Therefore, the use of the novel mulch disclosed and claimed herein results in increased yield, earlier harvests, optimal use of fertilizer and reduced labor. Accordingly, it is considered to be more economic to use than more conventional mulch and fertilizer programs.

In essence, the multi-layer degradable agricultural mulch film includes a first or top layer which is formed from a water-soluble synthetic resin such as polyvinyl alcohol, methyl cellulose, hydroxyethyl cellulose or the like. The first layer also includes at least one releasable form of nitrogen such as urea or a water-soluble urea-formaldehyde condensation product and at least one releasable plant nutrient such as potassium phosphate in addition to the nitrogen. This first layer provides an initial amount of nutrient to a plant during the preplanting, preemergent and earlier emergent stages of growth.

The mulch film, according to the present invention, also includes a second or bottom layer formed as an adherent coating on the first layer. The second layer is formed from a water-soluble synthetic resin such as polyvinyl alcohol, methyl cellulose, hyroxyethyl cellulose or the like. However, the water-soluble synthetic resin in the second layer has an average molecular weight which is greater than the average molecular weight of the water soluble synthetic resin in the first layer. The second layer also includes at least one releasable form of nitrogen admixed therein, and a water-resistant polymer such as polyvinyl acetate or vinyl chloride copolymer (VCC) or the like to retard the degradation rate of the second layer and to slow the rate of release of the nitrogen. In this way, the second layer provides the needed nutrients to a plant during the later stages of its growth.

For some crops, it may be desirable to include at least one additional releasable plant nutrient such as a potassium phosphate in the second layer.

A multi-layer mulch film according to a preferred embodiment of the invention, also includes a third or intermediate layer. In this case, the intermediate layer is formed as an adherent coating on the second or bottom layer and the first or top layer is formed as an adherent coating on the intermediate layer.

The intermediate layer comprises a water-soluble synthetic resin such as a polyvinyl alcohol, methyl cellulose or hydroxyethyl cellulose. However, the resin in the intermediate layer has an average molecular weight which is greater than the average molecular weight of the resin in the first or top layer and which is less than the average molecular weight of the water-soluble resin in the second or bottom layer. The intermediate layer also includes at least one releasable form of nitrogen admixed therein and may also include a second releasable nutrient admixed therein. The preferred embodiment also includes a relatively thin film of water-resistant polymer such as polyvinyl acetate or vinyl chloride copolymer (VCC) to further slow the release of nutrients and to improve the bond between the intermediate layer and the bottom layer. And, the top layer in the preferred embodiment also includes a relatively thin layer of water-resistant resin for improving the bond between the top and intermediate layers.

The multi-layer degradable mulch films disclosed and claimed herein may be made in accordance with a novel process. In essence, the process includes the steps of forming a first solvent based solution comprising a water-resistant thermoplastic resin such as polyvinyl acetate and an organic solvent such as acetone. And when the desired amount of resin is dissolved, a thin coating is poured on a balanced clean glass plate and allowed to dry to thereby form a thin film.

A first aqueous admixture is formed which includes a water-soluble synthetic resin such as polyvinyl alcohol and at least one nitrogenous constituent such as a urea-formaldehyde condensation product. And then, a thin film of this solution is cast on top of the water-resistant film to form a first layer.

A second solvent based solution comprising a water resistant thermoplastic resin such as a polyvinyl acetate and an organic solvent such as acetone is formed. However, the resin concentration of the second solvent based solution is less than the resin concentration of the first solvent based solution. A relatively thin coating of the second solution i.e., relatively thin with respect to the thickness of the first water resistent film is spread on top of the film which was formed from the first aqueous admixture.

A second aqueous admixture is also prepared. The second aqueous admixture includes a water-soluble synthetic film-forming resin such as a polyvinyl alcohol. However, the average molecular weight of the resin is less than the average molecular weight of the water-soluble synthetic resin in the first layer. The second aqueous admixture also includes at least one nitrogeneous constituent and at least one additional nutrient such as a potassium phosphate.

A coating of this second aqueous admixture is applied to the first layer, i.e, on top of the second water-resistant film and dried to form a multi-layer film with controlled release of nutrients.

The thickness of the various layers, concentration of resins, molecular weights, amount and type of nutrients can all be varied to provide a degradable mulch film which is tailored to the needs of a particular crop. Also, other additives such as nitrogen inhibitors, fumigants, herbicides or the like may be added to the water soluble resins, the water resistant polymer, or both, as desired to enhance the properties of the mulch film and to provide multi-purpose products.

In addition, it should be recognized that the molecular weights of the water-soluble and water-resistant polymer can be varied substantially. For example, the use of polyvinyl alcohols having average molecular weights of from about 14,000 to about 100,000 and polyvinyl acetate having average molecular weights ranging from about 45,000 to about 190,000 are recommended.

DETAILED DESCRIPTION OF THE INVENTION

High cash value crops such as cucumbers, tomatoes, etc. need nutrients in three main stages for optimal growth and plant production. For example, such plants need most if not all of the required phosphorous and potassium and some nitrogen during the preplanting or preemergent stage. And during their second stage of growth, i.e., prior to fruiting, such plants require a medium dose of nitrogen and may require some phosphorous and potassium. And then, during the third stage of growth, i.e., the flowering or fruiting stage, the plants need a major portion of nitrogen and may need additional amounts of phosphorous and potassium.

Other crops such as corn, beans and eggplant need nutrients in two main stages. However, application of specific amounts of specific nutrients can be used to optimize production.

And, it has now been found that a multi-layer degradable mulch film according to the present invention can be tailored to provide optimal amounts of nutrients during the various stages of plant growth.

For example, a preferred embodiment of the present invention includes a water-soluble polymer such as polyvinyl alcohol having a relatively low average molecular weight within the range of about 15,000 to 22,000, phosphorous and potassium sources such as potassium phosphates, urea and the like. In some cases, the polyvinyl alcohol is replaced entirely or partially by methyl cellulose and/or hydroxyethyl cellulose. And in some cases, starch and/or fumigants can be included. This layer provides the needed nutrients in the preplanting or preemergent stage and may also be used to sterilize the soil.

The second layer includes a water-soluble polymer such as a polyvinyl alcohol, methyl cellulose or hydroxyethyl cellulose. However, the water-soluble polymer in the second layer has a medium average molecular weight ranging from about 22,000 to about 72,000. The second layer also includes a source of nitrogen such as a urea-formaldehyde polycondensate and may include a source of phosphorous and potassium. The second layer is also coated with a thin film of a water-resistant polymer such as polyvinyl acetate or vinyl chloride copolymer. This second layer provides the nutrients which are needed during the growth stage of the crop, i.e., prior to fruiting.

The third or bottom layer includes a water soluble polymer such as a polyvinyl alcohol having a relatively high molecular weight ranging from about 72,000 to about 100,000, and a source of nitrogen. It may also include a source of phosphorous and potassium, ethylene-glycol, starch, insecticides, pesticides, and fungicides. The third layer is also coated with a water-resistant polymer such as polyvinyl acetate having an average molecular weight which ranges from about 45,000 to about 190,000, and provides the nutrients which are needed during the flowering and fruiting stage.

The nutritional multi-layer film as described above is an integral composite that is relatively strong, flexible and which has a high degree of clarity. Other additives can of course be incorporated in the various layers.

For example, a nitrification inhibitor such as thiourea, dicyandiamide, sulfathiazole, 2-mercapto-1, 2, 4-triazole, guanylthiourea, 2-amino-4 chloro-6-(trichloromethyl-pyridine) and others can be used with urea to slow the rate of release of nitrogen. However, when a urea-formaldehyde condensate is used as a source of nitrogen, a nitrification inhibitor is not usually needed since the urea-formaldehyde condensate normally provides the desired slow release properties.

According to the presently preferred embodiment of the invention there are multiple major steps involved in the preparation of a multi-layer controlled release multinutrient degradable mulch that can be tailored to meet the needs of a specific crop.

For example, the bottom layer which is the slowest dissolving may be made of 20 to 25% water soluble polymer such as polyvinyl alcohol with a molecular weight ranging from about 72,000 to 100,000 and a degree of hydrolysis ranging from about 86 to about 89%. The bottom layer also includes from about 2–10% of a water resistant resin such as polyvinyl acetate or vinyl chloride copolymer, various nutrients containing nitrogen (N), phosphorous ($P_2O_5$) and potassium ($K_2O$) salts in the range of 4 to 38 gm/$m^2$ for nitrogen, 0–24 gm/$m^2$ of phosphorous and 0–32 gm/$m^2$ of potassium.

The second layer may contain 20–25% of a water soluble polyvinyl alcohol with medium molecular weight ranging from 22,000 to about 72,000, about 2–10% of water resistant resin such as polyvinyl acetate and various salts. The second layer includes from 1 to 28 gm/$m^2$ nitrogen, 4 to 25 gm/$m^2$ phosphorous and 0 to 44 gm/$m^2$ potassium.

The third or top layer is the fastest dissolving layer and consists of 20 to 25% of low molecular weight polyvinyl alcohol with molecular weights ranging from 15,000 to 22,000 and salts containing sodium, phosphorous and potassium ranging from about 3 to 26 gm/$m^2$ nitrogen, 5 to 33 gm/m2 for phosphorous and from about 5 to 46 gm/m2 for potassium.

The source of nitrogen in the above composite film is mainly urea and urea-formaldehyde polycondensates. When urea is used nitrification inhibitors can be added if deemed necessary. On the other hand, when urea-formaldehyde is added there is no need for nitrification inhibitors to be added because urea-formaldehyde is prepared in such a way as to provide slow release characteristics. In addition according to our preparation procedure the urea-formaldehyde acts as a binder between the various layers of the composite film. Thus the urea-formaldehyde used in the present invention is prepared according to the following procedure.

A stirred solution of urea (2064 g) in water (2400 ml) was heated to 80° C. Then, 5568 g of paraformaldehyde was added. The pH of the resulting solution was adjusted to 8–8.5 by the addition of 10% potassium hydroxide. During the addition, the mixture was stirred continuously until a clear solution was obtained approximately (45 min.) The pH was kept between 8 and 8.5 throughout this step. At the end of this period the temperature of the solution was about 94°–95° C. Then the pH of the solution was lowered to 4.8 by the addition of 14 N sulfuric acid (18 ml) and stirring continued for an additional 30 min. During this time a vigorous reaction occurred and gases were evolved. The solution was then neutralized by the addition of a 10% potassium hydroxide solution (50 ml) and cooled down from 97°–98° C. to 45° C. (within 20 min.) This step was carried out by taking the solution out of the flask. The solution was heated again to 90° and 2392.8 g of urea was added. After about five minutes, a clear solution was obtained and the pH was adjusted to 5.0 by the addition of formic acid (2 ml). The reaction was continued for 15 min (including the time of formic acid addition). The pH of the reaction mixture was then raised to 9.5–10 by the addition of 10% potassium hydroxide solution after the reaction solution was cooled down to room temperature. The solid content of the final solution was between 65 and 72%. Its final viscosity at 20° C. was between 1000–1200 cp and the formaldehyde to urea ratio was 2.5:1.

The preparation of the multi-layer composite film requires several steps. The film is made by solution casting. For example, the casting solution may be made by adding polyvinyl alcohol to water and heating the mixture with continuous stirring at 60°–100° C. until a clear solution is obtained. The required amounts of additives, such as nutrient salts and others, are added to the polymeric solution. The clear solution is then filtered and cooled to 30°–40° C. prior to its casting on glass plates. A second solution mixture is prepared by adding 20–100 grams of polyvinyl acetate with molecular weight ranging from 45,000 to 190,000 to a reaction vessel containing 1225–1125 ml. of acetone. The reaction mixture is refluxed until all of the polymer is dissolved. Then, the reaction solution is cooled to room temperature and the solid content of the final solution ranges between 2–10% with viscosities ranging from 3 to 50 cp when measured at 25° C.

The multi-layer film is cast as follows: a thin coating of polyvinyl acetate solution is poured onto a balanced clean glass plate. The thickness of this layer is controlled by the concentration of the polyvinyl acetate solution that normally ranges between 2–10%. The film is dried and the nutritional solution of the bottom layer is cast on top of the polyvinyl acetate. And, again the thickness of this layer is controlled by the concentration of the nutritional solution that ranges between about 2–15%. After this layer is dried a second solution of polyvinyl acetate with concentrations ranging from 2–5% is added. The concentration in the second polyvinyl acetate solution being less than the concentration in the first. Then, after drying, a second layer of a nutritional solution is cast on top of the second polyvinyl acetate casting. This layer is then coated with a third relatively thin layer of polyvinyl acetate by casting from a 2–5% concentrated solution. And, the concentration of the resin in this coating is less than the concentration in the second water resistant layer so that the thickness of the final layer of water-resistant material is less than the other water resistant layers. Finally, the top layer is cast from a third nutritional solution. The procedure outlined previously produces films that are clear, flexible with good mechanical properties. The total film thickness can be made between 0.1 mm to 0.7 mm depending on the crop type and length of season. It should also be pointed out that additional layers can be made for a more sophisticated and more demanding high cash value crops.

Other water resistant polymers that can be used in place of polyvinyl acetate are vinyl chloride copolymer, plasticized polyvinyl chloride, ethylene acrylic acid, and ethylene ethyl acrylate.

It should be understood that the polyvinyl alcohol can be replaced entirely or partially by methyl cellulose and/or hydroxyethyl cellulose and that polyvinyl acetate can be entirely or partially replaced by vinyl chloride copolymer as will be readily understood by those skilled in the art. It should be apparent to those skilled in the art that other molecular weights than those disclosed herein can be used to control the rate of release of nutrients. It should also be recognized that the sandwiching of the water-soluble layers by different thicknesses of water resistant polymer to control the release of nutrients and mechanical properties of the mulch film is an important aspect of the present invention.

The following examples further illustrate the present invention.

A multi-layer mulching film according to a first embodiment of the invention was prepared as follows.

Eighty grams of polyvinyl acetate having a molecular weight of 160,000 was added to a reaction flask containing 800 ml of acetone. The reaction mixture was refluxed until all of the polyvinyl acetate dissolved and a clear polyvinyl acetate solution obtained.

A second solution was prepared by mixing 250 grams of polyvinyl alcohol having a molecular weight of about 100,000 with 8 liters of water in a 10 liter capacity reaction vessel. The mixture of polyvinyl alcohol and water was heated to 70° to 85° C. and held at that temperature until a clear polymeric solution was obtained. Then 50 gms of dipotassium hydrogen phosphate and 1000 grams of urea/formaldehyde solution (70% solids) were added successively to the polymeric solution with continuous stirring to thereby produce a solution having a concentration of about 10% solids, i.e, 10% solids and 90% water. The solids include PVA and nutrients. The solution has a pH of between 7.8 and 8.3. The solution was then cooled to about 30° C.

A glass plate was coated with the polyvinyl acetate solution, dried and then coated with the polyvinyl alcohol nutrient solution and dried overnight at room temperature. The resulting bottom layer contained 95% by weight polyvinyl alcohol and nutrients and 5% polyvinyl acetate.

A second or middle layer was then formed by adding a thin coating of a second polyvinyl acetate solution on to the surface of the bottom layer, dried and adding a second coating of a polyvinyl alcohol nutrient solution.

The second polyvinyl alcohol nutrient solution was prepared by adding 125 grams of polyvinyl alcohol having a molecular weight of about 49,000 to 8 liters of water in essentially the same manner as described above. 178.5 grams of a urea/formaldehyde solution (70% solids), 50 grams of dipotassium hydrogen phosphate, and 200 grams of starch were added to the second polyvinyl alcohol solution.

The resulting solution was poured onto the second polyvinyl acetate coating and dried overnight at room temperature. The middle layer included 4% of the polyvinyl acetate and 96% of the polyvinyl alcohol nutrient mixture.

A third or top layer was formed by adding an additional thin coating of polyvinyl acetate solution on to the top surface of the middle layer, drying the polyvinyl acetate coating and adding a third coating of a third polyvinyl alcohol nutrient solution.

The third polyvinyl alcohol nutrient casting solution (10% concentration) was prepared in a similar manner to the first and second casting solutions but with the following composition. 250 grams of polyvinyl alcohol having a molecular weight of about 15,000, 60 grams of urea, 230 grams of dipotassium hydrogen phosphate and 470 grams of starch were used. And this solution was poured onto the third polyvinyl acetate coating and dried overnight at room temperature. The top layer included 2% polyvinyl acetate and 98% polyvinyl alcohol nutrient mixture.

The multilayer nutritional film according to this first embodiment of the invention included the following amounts of nutrients:

| Layer | N(gm/m$^2$) | P$_2$O$_5$(gm/m$^2$) | K$_2$O(gm/m$^2$) |
|---|---|---|---|
| Bottom | 28.56 | 4.08 | 5.40 |
| Middle | 5.10 | 4.08 | 5.40 |
| Top | 7.97 | 18.77 | 24.84 |
| Total | 41.63 | 26.93 | 35.64 |

The multilayer nutritional film disclosed in this example had the following mechanical properties:

| Tensile Strength kg/cm$^2$ | Elongation at Break (%) | Moisture (%) | Film thickness(cm) |
|---|---|---|---|
| 78.2 | 61.3 | 11.91 | 0.033 |

The same general procedures as outlined in Example 1 were followed for examples 2 through 33 except that the compositions and concentrations of the following ingredients were varied to obtain multi-layer films with various distributions of nutrients to meet the needs of various crops. The variables that were changed include: different water soluble synthetic resins such as polyvinyl alcohol, methyl cellulose and hydroxyethyl cellulose, different concentrations of the water soluble synthetic resins, different water resistant polymer such as polyvinyl acetate, vinyl chloride copolymer, different concentrations of the water resistant polymer, different weight percentages of urea-formaldehyde, dipotassium phosphate, tri-potassium phosphate, ethylene glycol, potassium nitrate, starch and triethyl phosphate. The molecular weights of the water soluble synthetic resin, casting solution concentration and film thickness were also varied.

The techniques for preparing the various examples will be readily understood by those skilled in the art based on the disclosure with respect to example 1. The techniques are also similar to those claimed in our co-pending application entitled Degradable Agricultural Plastic Articles, e.g. Mulching Film Comprising Slowly Released Multinutrients in a Matrix of Thermoplastic, and Process for Preparing Same, Ser. No. 792,656, filed October 29, 1985 which is incorporated herein by reference in its entirety.

As used herein and throughout these examples the following abbreviations have been used: PVA for polyvinyl alcohol; MC for methyl cellulose: type 1500 having a viscosity of 1500 c.p. when a 2% aqueous solution is measured at 25° C., type 4000 having a viscosity of 4000 c.p. when a 2% aqueous solution is measured at 25° C.; HEC for hydroxyethyl cellulose; U/F for urea formaldehyde condensation products (70% solids content); TEP for triethylphosphate; PVAC for polyvinyl acetate; VCC for vinyl chloride copolymer; M. Wt. for average molecular weight, and Sol-Conc. for solution concentration.

The chemical composition and mechanical properties of multi-layer nutritional mulch films for examples 1–24 are set forth in Table 1.

TABLE 1

Chemical Composition and Mechanical Properties of Various Multilayer Nutritional Films (Sample Nos. 1-24).

| Example No. | Layer | 25% PVA of M.Wt. | U/F (%) | Urea (%) | K₂HPO₄ (%) | K₃PO₄ (%) | Ethylene Glycol (%) | KH₂PO₄ (%) | KNO₃ (%) | Starch (%) | TEP (%) | Casting Solution Conc. (%) | PVAC Coating (%) | N (g/m²) | NPK P₂O₅ (g/m²) | K₂O (g/m²) | Tensile Strength (kg/cm²) | Elongation at Break (%) | Moisture (%) | Film Thickness |
|---|---|---|---|---|---|---|---|---|---|---|---|---|---|---|---|---|---|---|---|---|
| 1 | Bottom | 100,000 | 70 | — | 5 | — | — | — | — | — | — | 10 | 5 | 28.56 | 4.08 | 5.40 | — | — | — | — |
|  | Middle | 49,000 | 25 | — | 10 | — | — | — | — | — | — | 5 | 4 | 5.10 | 4.08 | 5.40 | — | — | — | — |
|  | Top | 22,000 | 6 | 6 | 23 | — | — | — | — | — | — | 10 | 2 | 7.97 | 18.77 | 24.84 | — | — | — | — |
|  | Total |  |  |  |  |  |  |  |  |  |  |  |  | 41.63 | 26.93 | 35.64 | 78.2 | 61.3 | 11.91 | 0.033 |
| 2 | Bottom | 100,000 | 40 | 5 | 10 | 15 | — | — | — | — | — | 10 | 10 | 20.92 | 18.21 | 30.75 | — | — | — | — |
|  | Middle | 49,000 | 25 | 10 | 5 | 10 | — | — | 15 | 5 | — | 10 | 5 | 14.37 | 10.78 | 32.65 | — | — | — | — |
|  | Top | 15,000 | 10 | — | — | 25 | — | — | — | 20 | 30 | — | 10 | 5 | 13.28 | 16.75 | 33.25 | — | — | — | — |
|  | Total |  |  |  |  |  |  |  |  |  |  |  |  | 48.57 | 45.74 | 96.65 | 20.7 | 94.0 | 22.90 | 0.064 |
| 3 | Bottom | 72,000 | 40 | — | — | 10 | — | — | 20 | 5 | — | 10 | 10 | 21.88 | 6.70 | 31.90 | — | — | — | — |
|  | Middle | 49,000 | 30 | 6 | — | 10 | — | — | 20 | 15 | — | 10 | 5 | 17.80 | 6.70 | 31.90 | — | — | — | — |
|  | Top | 22,000 | 6 | 6 | 23 | — | — | — | — | 40 | — | 10 | 2 | 7.97 | 18.77 | 24.84 | — | — | — | — |
|  | Total |  |  |  |  |  |  |  |  |  |  |  |  | 47.65 | 32.17 | 88.64 | 37.1 | 69.0 | 14.80 | 0.055 |
| 4 | Bottom | 100,000 | 70 | — | 5 | — | — | — | — | — | — | 10 | 5 | 28.56 | 4.08 | 5.40 | — | — | — | — |
|  | Middle | 49,000 | 25 | — | 10 | — | — | — | — | 40 | — | 10 | 2 | 10.20 | 8.16 | 10.80 | — | — | — | — |
|  | Top | 15,000 | — | 6 | 23 | — | — | — | — | 46 | — | 10 | 2 | 5.52 | 18.77 | 24.84 | — | — | — | — |
|  | Total |  |  |  |  |  |  |  |  |  |  |  |  | 44.28 | 31.01 | 41.04 | 36.1 | 55.0 | 17.60 | 0.046 |
| 5 | Bottom | 100,000 | 40 | — | — | 7.5 | — | — | 20 | 7.5 | — | 10 | 5 | 21.88 | 5.03 | 28.58 | — | — | — | — |
|  | Middle | 49,000 | 25 | — | — | 7.5 | — | — | 20 | 22.5 | — | 10 | 2 | 15.76 | 5.03 | 28.58 | — | — | — | — |
|  | Top | 15,000 | — | 6 | 23 | — | — | — | — | 46 | — | 10 | 2 | 5.52 | 18.77 | 24.84 | — | — | — | — |
|  | Total |  |  |  |  |  |  |  |  |  |  |  |  | 43.16 | 28.83 | 82.00 | 43.6 | 69.0 | 11.6 | 0.049 |
| 6 | Bottom | 100,000 | 50 | — | 10 | — | — | — | 15 | — | — | 10 | 5 | 24.57 | 8.16 | 24.75 | — | — | — | — |
|  | Middle | 49,000 | 25 | 5 | 20 | — | — | — | 15 | 15 | — | 10 | 2 | 14.37 | 16.32 | 35.55 | — | — | — | — |
|  | Top | 15,000 | 10 | 5 | 25 | — | — | — | 15 | 15 | 5 | 10 | 2 | 12.85 | 24.30 | 40.95 | — | — | — | — |
|  | Total |  |  |  |  |  |  |  |  |  |  |  |  | 51.79 | 48.78 | 101.25 | 22.8 | 99.1 | 12.9 | 0.05 |
| 7 | Bottom | 100,000 | 30 | 25 | 10 | — | — | — | 10 | — | 10 | 10 | 10 | 38.02 | 8.16 | 20.10 | — | — | — | — |
|  | Middle | 72,000 | 20 | 10 | 20 | — | — | — | 15 | — | 10 | 10 | 5 | 21.53 | 8.16 | 35.55 | — | — | — | — |
|  | Top | 15,000 | 15 | 5 | 25 | — | — | — | 20 | — | 10 | 10 | 5 | 16.28 | 28.20 | 45.60 | — | — | — | — |
|  | Total |  |  |  |  |  |  |  |  |  |  |  |  | 75.83 | 60.48 | 101.25 | 35.2 | 257 | 11.4 | 0.036 |
| 8 | Bottom | 100,000 | 30 | 25 | 10 | — | — | — | 10 | 7.5 | — | 5 | 5 | 19.01 | 4.08 | 10.05 | — | — | — | — |
|  | Middle | 72,000 | 20 | 10 | 20 | — | — | — | 15 | 22.5 | — | 5 | 5 | 10.77 | 12.06 | 17.78 | — | — | — | — |
|  | Top | 15,000 | 15 | 5 | 25 | — | — | — | 20 | 40 | — | 5 | 5 | 8.14 | 14.10 | 22.80 | — | — | — | — |
|  | Total |  |  |  |  |  |  |  |  |  |  |  |  | 37.92 | 30.24 | 50.63 | 28.9 | 117 | 10.9 | 0.026 |
| 9 | Bottom | 100,000 | 40 | 5 | — | 7.5 | — | — | 20 | — | 5 | 10 | 5 | 45.61 | 31.07 | 78.09 | — | — | — | — |
|  | Middle | 49,000 | 25 | — | — | 7.5 | — | — | 20 | — | 5 | 10 | 5 | 21.88 | 5.03 | 28.58 | — | — | — | — |
|  | Top | 22,000 | 6 | 6 | 13 | — | — | 10 | — | — | 5 | 10 | 5 | 7.97 | 21.01 | 20.94 | — | — | — | — |
|  | Total |  |  |  |  |  |  |  |  |  |  |  |  | 45.61 | 31.07 | 78.09 | 64.05 | 35.6 | 11.97 | 0.046 |
| 10 | Bottom | 72,000 | 35 | 5 | — | — | — | — | 10 | 20 | 5 | 10 | 5 | 24.44 | 14.30 | 25.50 | — | — | — | — |
|  | Middle | 49,000 | 20 | 10 | 10 | — | — | — | 15 | 20 | 5 | 10 | 5 | 16.93 | 12.06 | 24.75 | — | — | — | — |
|  | Top | 22,000 | 10 | 10 | 15 | — | — | — | 10 | 25 | 5 | 10 | 5 | 16.06 | 16.14 | 25.50 | — | — | — | — |
|  | Total |  |  |  |  |  |  |  |  |  |  |  |  | 57.43 | 42.50 | 75.75 | 63.70 | 26.90 | 10.05 | 0.045 |
| 11 | Bottom | 100,000 | 40 | 5 | 25 | — | — | — | — | — | — | 10 | 10 | 20.92 | 24.30 | 27.00 | — | — | — | — |
|  | Middle | 49,000 | 25 | 5 | 10 | — | — | — | 10 | 10 | — | 10 | 2 | 17.58 | 18.76 | 33.40 | — | — | — | — |
|  | Top | 15,000 | 10 | 5 | 20 | — | — | — | 10 | 25 | — | 10 | 5 | 11.46 | 20.22 | 30.90 | — | — | — | — |
|  | Total |  |  |  |  |  |  |  |  |  |  |  |  | 49.96 | 63.28 | 91.30 | 35.50 | 52.1 | 13.01 | 0.047 |
| 12 | Bottom | 100,000 | 70 | — | 5 | — | — | — | — | — | — | 10 | 5 | 28.56 | 4.08 | 5.40 | — | — | — | — |
|  | Middle | 49,000 | 35 | — | 15 | — | — | — | 10 | 10 | 5 | 10 | 2 | 17.06 | 16.14 | 25.50 | — | — | — | — |

TABLE 1-continued

Chemical Composition and Mechanical Properties of Various Multilayer Nutritional Films (Sample Nos. 1-24).

| Example No. | Layer | 25% PVA of M.Wt. | U/F (%) | Urea (%) | K₂HPO₄ (%) | K₃PO₄ (%) | Ethylene Glycol (%) | KH₂PO₄ (%) | KNO₃ (%) | Starch (%) | TEP (%) | Casting Solution Conc.(%) | PVAC Coating (%) | N (g/m²) | NPK P₂O₅ (g/m²) | K₂O (g/m²) | Tensile Strength (kg/cm²) | Elongation at Break (%) | Moisture (%) | Film Thickness |
|---|---|---|---|---|---|---|---|---|---|---|---|---|---|---|---|---|---|---|---|---|
| | Top | 22,000 | — | 6 | 23 | — | — | — | 10 | 20 | 10 | 10 | 2 | 10.75 | 28.57 | 34.14 | — | — | — | — |
| | Total | | | | | | | | | | | | | 56.37 | 46.79 | 65.04 | 44.20 | 29.0 | 12.67 | 0.051 |
| 13 | Bottom | 72,000 | 50 | 10 | 10 | — | — | — | — | — | 5 | 5 | 5 | 14.80 | 6.03 | 5.40 | — | — | — | — |
| | Middle | 49,000 | 20 | 10 | 12.5 | — | — | — | — | 37.5 | 5 | 5 | 2 | 4.08 | 7.05 | 6.75 | — | — | — | — |
| | Top | 22,000 | 10 | 10 | 25 | — | — | — | — | 25 | 5 | 5 | 2 | 6.64 | 12.15 | 13.50 | — | — | — | — |
| | Total | | | | | | | | | | | | | 25.52 | 25.23 | 25.65 | 45.25 | 93.5 | 16.88 | 0.027 |
| 14 | Bottom | 72,000 | 30 | 6 | 6 | — | — | — | — | 33 | 5 | 5 | 5 | 8.88 | 2.45 | 3.24 | — | — | — | — |
| | Middle | 49,000 | 5 | 6 | 6 | — | — | — | — | 59 | 5 | 5 | 2 | 1.02 | 4.40 | 3.24 | — | — | — | — |
| | Top | 22,000 | 6 | 6 | 15 | — | — | — | — | 45 | 3 | 5 | 2 | 3.98 | 7.29 | 8.10 | — | — | — | — |
| | Total | | | | | | | | | | | | | 13.88 | 14.14 | 14.50 | 17.30 | 23.84 | 11.16 | 0.027 |
| 15 | Bottom | 72,000 | 30 | 6 | 6 | — | 5 | — | — | 28 | 5 | 5 | 5 | 8.88 | 2.45 | 3.24 | — | — | — | — |
| | Middle | 49,000 | 5 | 6 | 6 | — | 5 | — | — | 54 | 5 | 5 | 2 | 1.02 | 4.40 | 3.24 | — | — | — | — |
| | Top | 22,000 | 6 | 6 | 15 | — | 10 | — | — | 35 | 3 | 5 | 2 | 3.98 | 7.29 | 8.10 | — | — | — | — |
| | Total | | | | | | | | | | | | | 13.88 | 14.14 | 14.58 | 45.06 | 5.94 | 7.73 | 0.025 |
| 16 | *Bottom | 100,000 | 40 | 15 | 20 | — | — | — | — | — | 5 | 2 | 5 | 6.02 | 4.04 | 4.32 | — | — | — | — |
| | Middle | 49,000 | 25 | 15 | 20 | — | — | — | 5 | — | 10 | 2 | 5 | 5.08 | 4.82 | 5.25 | — | — | — | — |
| | Top | 22,000 | 15 | 10 | 20 | — | — | — | 10 | 5 | 15 | 2 | 5 | 3.62 | 5.60 | 6.18 | — | — | — | — |
| | Total | | | | | | | | | | | | | 14.72 | 14.46 | 15.75 | 10.65 | 78.16 | 11.60 | 0.01 |
| 17 | *Bottom | 100,000 | 40 | 15 | 20 | — | — | — | 5 | — | 5 | 2 | 10 | 6.02 | 4.04 | 4.32 | — | — | — | — |
| | Middle | 49,000 | 25 | 15 | 20 | — | — | — | 5 | 5 | 10 | 2 | 10 | 5.08 | 4.82 | 5.25 | — | — | — | — |
| | Top | 22,000 | 15 | 10 | 20 | — | — | — | 10 | 5 | 15 | 2 | 10 | 3.62 | 5.60 | 6.18 | — | — | — | — |
| | Total | | | | | | | | | | | | | 14.72 | 14.46 | 15.75 | 19.15 | 69.60 | 14.5 | 0.006 |
| 18 | Bottom | 100,000 | 50 | 15 | 25 | — | — | — | 15 | 15 | — | 10 | 10 | 20.40 | 20.40 | 27.00 | — | — | — | — |
| | Middle | 49,000 | 25 | 15 | — | 20 | — | — | 10 | 15 | — | 10 | 5 | 14.37 | 13.40 | 40.55 | — | — | — | — |
| | Top | 15,000 | 10 | 10 | 20 | — | — | — | 15 | 35 | — | 10 | 2 | 6.86 | 16.32 | 30.90 | — | — | — | — |
| | Total | | | | | | | | | | | | | 41.63 | 50.12 | 98.45 | 34.16 | 24.45 | 14.23 | 0.053 |
| 19 | Bottom | 100,000 | 40 | 10 | 10 | — | — | — | 10 | 5 | 5 | 10 | 10 | 28.30 | 12.06 | 20.10 | — | — | — | — |
| | Middle | 49,000 | 25 | 5 | 25 | — | — | — | 10 | 15 | 10 | 10 | 5 | 17.58 | 24.30 | 36.30 | — | — | — | — |
| | Top | 22,000 | 10 | — | 15 | — | — | — | 20 | 15 | 15 | 10 | 5 | 9.64 | 23.94 | 34.80 | — | — | — | — |
| | Total | | | | | | | | | | | | | 55.52 | 60.30 | 91.20 | 26.93 | 95.85 | 14.18 | 0.046 |
| 20 | Bottom | 72,000 | 35 | 15 | 10 | — | 5 | — | 10 | — | 5 | 10 | 10 | 30.86 | 12.06 | 20.10 | — | — | — | — |
| | Middle | 49,000 | 20 | 15 | 20 | — | 5 | — | 10 | — | 5 | 10 | 5 | 24.74 | 24.12 | 30.90 | — | — | — | — |
| | Top | 22,000 | 10 | 10 | 25 | — | 5 | — | 15 | — | 5 | 10 | 5 | 17.45 | 32.10 | 40.95 | — | — | — | — |
| | Total | | | | | | | | | | | | | 73.05 | 68.28 | 91.95 | 24.14 | 189.71 | 15.98 | 0.048 |
| 21 | Bottom | 72,000 | 35 | 15 | 10 | — | — | — | 10 | 5 | 5 | 5 | 10 | 15.43 | 6.03 | 10.05 | — | — | — | — |
| | Middle | 49,000 | 20 | 15 | 20 | — | — | — | 10 | 5 | 5 | 5 | 10 | 12.37 | 12.06 | 15.45 | — | — | — | — |
| | Top | 22,000 | 10 | 10 | 25 | — | — | — | 15 | 5 | 5 | 5 | 10 | 8.73 | 16.05 | 20.48 | — | — | — | — |
| | Total | | | | | | | | | | | | | 36.53 | 34.14 | 45.98 | 30.48 | 242.0 | 16.0 | 0.023 |
| 22 | Bottom | 100,000 | 50 | — | 10 | — | 5 | — | 10 | 5 | 5 | 5 | 10 | 20.40 | 12.06 | 10.80 | — | — | — | — |
| | Middle | 49,000 | 35 | — | 15 | — | 5 | — | 10 | 5 | 5 | 5 | 2 | 17.06 | 16.14 | 25.50 | — | — | — | — |
| | Top | 22,000 | 25 | 10 | 10 | — | 5 | — | 15 | 5 | 5 | 5 | 2 | 23.57 | 12.06 | 24.75 | — | — | — | — |
| | Total | | | | | | | | | | | | | 61.03 | 40.26 | 61.05 | 27.81 | 46.73 | 12.16 | 0.053 |
| 23 | Bottom | 100,000 | 50 | 15 | 10 | — | 5 | — | 10 | 5 | 5 | 5 | 10 | 10.20 | 6.03 | 5.40 | — | — | — | — |
| | Middle | 49,000 | 35 | — | 15 | — | 5 | — | 10 | 5 | 5 | 5 | 2 | 8.53 | 8.07 | 12.75 | — | — | — | — |
| | Top | 15,000 | 25 | 10 | 10 | — | 5 | — | 15 | 5 | 5 | 5 | 2 | 11.79 | 6.03 | 12.38 | — | — | — | — |
| | Total | | | | | | | | | | | | | 30.52 | 20.13 | 30.53 | 43.22 | 150.45 | 10.48 | 0.021 |

TABLE 1-continued

Chemical Composition and Mechanical Properties of Various Multilayer Nutritional Films (Sample Nos. 1-24).

| Example No. | Layer | 25% PVA of M.Wt. | U/F (%) | Urea (%) | K₂HPO₄ (%) | K₃PO₄ (%) | Ethylene Glycol (%) | KH₂PO₄ (%) | KNO₃ (%) | Starch (%) | TEP (%) | Casting Solution Conc.(%) | PVAC Coating (%) | NPK N (g/m²) | NPK P₂O₅ (g/m²) | NPK K₂O (g/m²) | Tensile Strength (kg/cm²) | Elongation at Break (%) | Moisture (%) | Film Thickness |
|---|---|---|---|---|---|---|---|---|---|---|---|---|---|---|---|---|---|---|---|---|
| 24 | Bottom | 100,000 | 50 | — | — | — | — | — | — | — | — | 2.5 | 10 | 5.10 | 0.00 | 0.00 | — | — | — | — |
|  | Top | 22,000 | 25 | 15 | 20 | — | — | 15 | — | 25 | — | 5 | 5 | 12.00 | 15.96 | 15.98 | — | — | — | — |
|  | Total | — | — | — | — | — | — | — | — | — | — | — | — | 17.10 | 15.96 | 15.98 | 63.03 | 39.5 | 12.6 | 0.018 |

Abbreviations: PVA = polyvinyl alcohol; U/F = urea formaldehyde condensation products; K₂HPO₄ = dipotassium hydrogen phosphate; KH₂PO₄ = potassium dihydrogen phosphate; KNO₃ = potassium nitrate; TEP = triethyl phosphate; PVAC = polyvinyl acetate (M.Wt. 160,000).

Table 2 sets forth the chemical compositions and mechanical properties of the multilayer nutritional mulch films according to examples 25 through 33. These embodiments of the invention were prepared in essentially the same manner as set forth in example 1. However, examples 25 through 33 include several significant changes.

For example, in example 25 the water-soluble polyvinyl alcohol was replaced by water-soluble hydroxyethyl cellulose.

In example 26, the water-soluble polyvinyl alcohol was replaced by a water-soluble methyl cellulose whose 2% aqueous solution viscosity at 25° C. was 1500 (cp).

In example 27, the water soluble polyvinyl alcohol was replaced with a water soluble methyl cellulose whose 2% aqueous solution viscosity at 25° C. was 4000(cp).

In example 28 the water resistant polyvinyl acetate was partially replaced by a vinyl chloride copolymer.

In example 29, the water-resistant polyvinyl acetate in each layer was replaced by a vinyl chloride copolymer.

In example 30, the water-soluble polyvinyl alcohol was replaced by water soluble hydro exyethyl cellulose and the water resistant polyvinyl acetate was replaced by vinyl chloride copolymer.

In example 31, the water-soluble hydroxethyl cellulose in example 30 was replaced by methyl cellulose whose 2% aqueous solution viscosity at 25° C. was 1500 (cp).

In example 32, the multi-layer mulching film according to this example was prepared as follows: the casting solution of the bottom layer was prepared by adding a mixture of hydroxyethyl cellulose (125 gm) and 125 gm of polyvinyl alcohol of M. Wt. 100,000 to a reaction vessel (10 liter) capacity containing 8 liters of water. The reaction mixture was heated up to 70–90° C. The heating was continued until a clear solution was obtained. Then, dipotassium hydrogen phosphate (100 gm), (50 gm) urea were added successfully to the clear polyvinyl alcohol solution. The concentration of the resulting mixture was 10%. The cold solution was poured on a balanced glass plate coated with 5% polyvinyl acetate. After drying, 5% of vinyl chloride copolymer (VCC) that was prepared in toluene/acetone mixture was poured on the surface of the nutritional bottom layer. The casting of the middle layer was prepared as mentioned above from 125 gm of polyvinyl alcohol of molecular weight 72,000, 125 gm of hydroxyethyl cellulose, 571 gm of urea-formadehyde (70% solid content), dipotassium nitrate (100 gm) and triethyl phosphate (50 gm). The concentration of the resulting solution was 10%. This solution was poured on the surface of the bottom layer which was coated previously with 5% VCC. After drying, the third layer of the casting solution of 10% concentration was prepared as previously mentioned above from the following components. 125 gm of polyvinyl alcohol of molecular weight 22,000, 125 gm of hydroxyethyl cellulose, dipotassium hydrogen phosphate (250 gm) and 286 gm of urea formaldehyde having 70% total solids content. This casting solution was poured on the surface of the middle layer after it had been coated with 5% of vinyl chloride copolymer. The mechanical properties and the composition of the resulted multilayer mulch film are reported in Table 2. The film was clear and flexible with good tearing strength.

With respect to example 33, the same procedure of example 32 was followed except that hydroxyethyl cellulose was replaced by methyl cellulose whose 2% aqueous solution viscosity at 250° C. is 1500 (cp).

TABLE 2

Chemical Composition and Mechanical Properties of Various Multilayer Nutritional Film (Samples 25-33).

| Example No. | Layer | 25% of PVA M.Wt. | MC Type | HEC | U/F | K₂HPO₄ | KH₂PO₄ | Urea | KNO₃ | TEP | Starch | Cast. Sol. Conc. | Coating Conc. PVAC (%) | Coating Conc. VCC (%) | N (g/m²) | P₂O₅ (g/m²) | K₂O (g/m²) | Tens. Str. (kg/cm²) | Elong. at Break (%) | Moisture (%) | Film Thickness (cm) |
|---|---|---|---|---|---|---|---|---|---|---|---|---|---|---|---|---|---|---|---|---|---|
| 25 | Bottom | — | — | 25 | 75 | — | — | — | — | — | — | 10 | 5 | — | 30.60 | 0.00 | 0.00 | — | — | — | — |
|  | Middle | — | — | 25 | 40 | 15 | — | 5 | 10 | 5 | — | 10 | 2 | — | 23.70 | 16.14 | 18.98 | — | — | — | — |
|  | Top | — | — | 25 | 40 | 10 | — | 10 | 10 | 5 | — | 10 | 2 | — | 28.30 | 12.06 | 13.58 | — | — | — | — |
|  | Total | | | | | | | | | | | | | | 82.60 | 28.20 | 32.56 | 19.38 | 81.61 | 9.17 | 0.032 |
| 26 | Bottom | — | 1500(25) | — | 75 | — | — | — | — | 5 | — | 5 | 5 | — | 15.30 | 0.00 | — | — | — | — | — |
|  | Middle | — | 1500(12.5) | — | 45 | 20 | — | 5 | 12.5 | 5 | — | 10 | 2 | — | 26.44 | 20.22 | 25.08 | — | — | — | — |
|  | Top | — | 1500(12.5) | — | 45 | 15 | — | 10 | 12.5 | 5 | — | 10 | 2 | — | 31.04 | 16.14 | 19.68 | — | — | — | — |
|  | Total | | | | | | | | | | | | | | 72.78 | 36.36 | 44.76 | 37.00 | 23.30 | 13.55 | 0.030 |
| 27 | Bottom | — | 4000(25) | — | 75 | — | — | — | — | 5 | — | 5 | 5 | — | 15.30 | 0.00 | 0.00 | — | — | — | — |
|  | Middle | — | 4000(12.5) | — | 45 | 20 | — | 5 | 12.5 | 5 | — | 10 | 2 | — | 26.44 | 20.22 | 25.08 | — | — | — | — |
|  | Top | — | 4000(12.5) | — | 45 | 15 | — | 10 | 12.5 | 5 | — | 10 | 2 | — | 31.04 | 16.14 | 19.68 | — | — | — | — |
|  | Total | | | | | | | | | | | | | | 72.78 | 36.36 | 44.76 | 56.30 | 11.20 | 11.40 | 0.022 |
| 28 | Bottom | 100,000 | — | — | 50 | 10 | — | 10 | 10 | 5 | 5 | 10 | 10 | — | 20.40 | 12.06 | 10.80 | — | — | — | — |
|  | Middle | 49,000 | — | — | 35 | 15 | — | — | 15 | 5 | 5 | 10 | — | — | 17.06 | 16.14 | 18.98 | — | — | — | — |
|  | Top | 15,000 | — | — | 25 | 10 | — | — | 20 | 5 | 5 | 10 | — | — | 23.57 | 12.06 | 14.97 | — | — | — | — |
|  | Total | | | | | | | | | | | | | | 61.03 | 40.26 | 44.75 | 32.72 | 121.80 | 13.28 | 0.053 |
| 29 | Bottom | 100,000 | — | — | 30 | 10 | — | 25 | 10 | 10 | — | 5 | — | 10 | 19.01 | 4.08 | 6.79 | — | — | — | — |
|  | Middle | 72,000 | — | — | 20 | 20 | — | 10 | 15 | 10 | — | 5 | — | 5 | 10.77 | 12.06 | 12.89 | — | — | — | — |
|  | Top | 15,000 | — | — | 15 | 25 | — | 5 | 20 | 10 | — | 5 | — | 5 | 8.14 | 14.10 | 16.28 | — | — | — | — |
|  | Total | | | | | | | | | | | | | | 37.92 | 30.24 | 35.96 | 53.60 | 159.00 | 10.30 | 0.01 |
| 30 | Bottom | — | — | 25 | 30 | 10 | — | 25 | 10 | 5 | — | 5 | — | 10 | 19.01 | 4.08 | 6.79 | — | — | — | — |
|  | Middle | — | — | 25 | 20 | 15 | — | 10 | 15 | 5 | — | 5 | — | 5 | 10.77 | 10.02 | 10.19 | — | — | — | — |
|  | Top | — | — | 25 | 15 | 20 | — | 5 | 20 | 5 | — | 5 | — | 5 | 8.14 | 12.06 | 13.58 | — | — | — | — |
|  | Total | | | | | | | | | | | | | | 37.92 | 26.16 | 30.56 | 26.50 | 122.50 | 12.60 | 0.019 |
| 31 | Bottom | — | 1500(25) | — | 50 | 10 | — | 10 | 10 | 5 | — | 5 | — | 10 | 20.40 | 12.06 | 10.80 | — | — | — | — |
|  | Middle | — | 1500(25) | — | 35 | 15 | — | — | 15 | 5 | — | 5 | — | 5 | 17.06 | 16.14 | 18.98 | — | — | — | — |
|  | Top | — | 1500(25) | — | 25 | 10 | — | 10 | 15 | 5 | — | 5 | — | 5 | 23.57 | 12.06 | 14.97 | — | — | — | — |
|  | Total | | | | | | | | | | | | | | 61.03 | 40.26 | 44.75 | 40.0 | 20.0 | 10.5 | 0.015 |
| 32 | Bottom | 100,000 (12.5) | — | 12.5 | 45 | 10 | — | 5 | 10 | 5 | 5 | 10 | 5 | — | 25.74 | 12.06 | 13.58 | — | — | — | — |
|  | Middle | 72,000 (12.5) | — | 12.5 | 40 | 10 | — | 10 | 10 | 5 | — | — | — | — | 28.30 | 12.06 | 13.58 | — | — | — | — |
|  | Top | 22,000 (12.5) | — | 12.5 | 20 | 25 | — | 10 | 15 | 5 | — | 10 | — | 5 | 21.53 | 24.30 | 31.17 | — | — | — | — |
|  | Total | | | | | | | | | | | | | | 75.57 | 48.42 | 58.33 | 12.73 | 118.9 | 13.28 | 0.044 |
| 33 | Bottom | 100,000 (12.5) | 1500 (12.5) | — | 45 | 10 | — | 5 | 10 | 5 | 5 | 10 | 5 | — | 75.57 25.74 | 48.42 12.06 | 58.33 13.58 | — | — | — | — |
|  | Middle | 72,000 (12.5) | 1500 (12.5) | — | 40 | 10 | — | 10 | 10 | 5 | — | 10 | — | — | 28.30 | 12.06 | 13.58 | — | — | — | — |
|  | Top | 22,000 (12.5) | 1500 | — | 20 | 25 | — | 10 | 15 | 5 | 5 | 10 | — | 5 | 21.53 | 24.30 | 31.17 | — | — | — | — |
|  | Total | | | | | | | | | | | | | | 75.57 | 48.42 | 58.33 | 26.9 | 34.2 | — | 0.023 |

Abbreviations: PVA = polyvinyl = alcohol; MC = methyl cellulose: type 1500 –2% aqueous solution viscosity at 25° C. is 1500 (cp), type 4000 (cp) - 2% aqueous solution viscosity at 25° C. is 4000 (cp); HEC = hydroxyethyl cellulose; U/F = urea formaldehyde condensation products (70% solid content); TEP = triethyl phosphate; PVAC = polyvinyl acetate; VCC = vinyl chloride copolymer.

The dissolution rates of several representative samples of the multi-layer nutritional mulch films are set forth in Table 3.

samples of the multi-layer nutritional mulch films which have been subjected to accelerated weathering tests are shown in Table 4.

TABLE 3

| Sample No. | Dissolution Rate of Multilayer Nutritional Film Dissolution rate (%) after immersion for (days) | | | | | | | | | | | |
|---|---|---|---|---|---|---|---|---|---|---|---|---|
| | 1 | 2 | 3 | 4 | 5 | 7 | 14 | 21 | 28 | 35 | 42 | 49 |
| 1 | — | — | — | — | — | 22.7 | 44.1 | 45.1 | 47.7 | 51.9 | 53.1 | 57.4 |
| 2 | 19.2 | 23.4 | 32.5 | 32.8 | 31.4 | 26.6 | 44.7 | 57.9 | 57.9 | 61.5 | 65.0 | — |
| 4 | — | — | — | — | — | 12.6 | 29.1 | 39.9 | 46.4 | 48.4 | 49.2 | 61.2 |
| 5 | 14.8 | 20.0 | 28.3 | 33.4 | 35.4 | 28.3 | 46.5 | 54.2 | 56.5 | 61.5 | 65.0 | — |
| 8 | — | — | — | — | — | 60.5 | 63.5 | 65.4 | 66.1 | 68.2 | — | — |
| 9 | — | — | — | — | — | 34.7 | 48.4 | 51.4 | 53.2 | 64.1 | 64.8 | 66.2 |
| 25 | 48.6 | 54.2 | 64.7 | 65.2 | 66.7 | — | — | — | — | — | — | — |

The mechanical properties of several representative

TABLE 4

Mechanical Properties of Multi-layered Nutritional Mulch Film Upon Accelerated Weathering Tests.

MECHANICAL PROPERTIES OF SAMPLES UPON ACCELERATED WEATHERING AFTER (DAYS)

| Example No. | Type of Cycle | Measured Parameters | 0 Mech. Prop. | 0 Moisture (%) | 2 Mech. Prop. | 2 Moisture (%) | 4 Mech. Prop. | 4 Moisture (%) | 6 Mech. Prop. | 6 Moisture (%) | 8 Mech. Prop. | 8 Moisture (%) | 10 Mech. Prop. | 10 Moisture (%) | 12 Mech. Prop. | 12 Moisture (%) |
|---|---|---|---|---|---|---|---|---|---|---|---|---|---|---|---|---|
| 3 | Dry | Tensile Strength (kg/cm$^2$) | 37.1 | 14.8 | 67 | 17.3 | 53.4 | 14.2 | 73.5 | 11.6 | 63.2 | 11.8 | 66.7 | 11.2 | 73.2 | 13.3 |
|   |     | Elongation at Break (%) | 69.0 | — | 23 | — | 31.0 | — | 14.0 | — | 14.0 | — | 10.0 | — | 10.0 | — |
|   | Wet | Tensile Strength (kg/cm$^2$) | — | — | 29.3 | 19.3 | 58.8 | 13.5 | 74.6 | 12.2 | 63.5 | 13.6 | 44.0 | 10.6 | 74.0 | 12.7 |
|   |     | Elongation at Break (%) | — | — | 40.0 | — | 28.0 | — | 21.0 | — | 19.0 | — | 14.0 | — | 22.7 | — |
| 6 | Dry | Tensile Strength (kg/cm$^2$) | 22.8 | 12.9 | 15.1 | 14.7 | 17.6 | 19.0 | 50.3 | 9.8 | 70.6 | 9.0 | 84.8 | 9.2 | 74.2 | 11.3 |
|   |     | Elongation at Break (%) | 99.0 | — | 68.0 | — | 46.0 | — | 13.0 | — | 6.0 | — | 10.0 | — | 10.0 | — |
|   | Wet | Tensile Strength (kg/cm$^2$) | — | — | 12.7 | 20.3 | 17.5 | 19.2 | 45.3 | 11.8 | 68.6 | 10.3 | 76.1 | 8.5 | 69.2 | 12.3 |
|   |     | Elongation at Break (%) | — | — | 62.0 | — | 48.0 | — | 10.0 | — | 10.0 | — | 18.0 | — | 13.0 | — |
| 10 | Dry | Tensile Strength (kg/cm$^2$) | 63.7 | 10.05 | 59.3 | 15.0 | 55.6 | 13.8 | 51.9 | 9.7 | 26.1 | 9.6 | 13.1 | 6.74 | 7.59 | 4.85 |
|    |     | Elongation at Break (%) | 26.9 | — | 33.5 | — | 30.48 | — | 7.1 | — | 4.9 | — | 2.65 | — | 2.05 | — |
|    | Wet | Tensile Strength (kg/cm$^2$) | — | — | 54.7 | 15.3 | 52.67 | 14.5 | 50.6 | 10.7 | 35.9 | 10.9 | 13.1 | 6.74 | 7.84 | 10.66 |
|    |     | Elongation at Break (%) | — | — | 34.1 | — | 35.34 | — | 7.82 | — | 4.69 | — | 2.65 | — | 3.7 | — |
| 12 | Dry | Tensile Strength (kg/cm$^2$) | 35.5 | 13.01 | — | — | 45.43 | 15.43 | 42.24 | 14.78 | 39.5 | 10.8 | 22.75 | 11.30 | BRITTLE | |
|    |     | Elongation at Break (%) | 52.1 | — | — | — | 13.69 | — | 7.44 | — | 3.15 | — | 2.73 | — | | |
|    | Wet | Tensile Strength (kg/cm$^2$) | — | — | — | — | 32.28 | 17.6 | 40.21 | 14.9 | 15.2 | 19.3 | 50.4 | 13.98 | BRITTLE | |
|    |     | Elongation at Break (%) | — | — | — | — | 29.9 | — | 15.83 | — | 9.8 | — | 10.3 | — | | |

Examples 34 and 35 illustrate the use of high and low molecular weight methyl cellulose and hydroxyethyl cellulose respectively and the use of a higher molecular weight polyvinyl acetate.

EXAMPLE 34

The same procedure of example 25 was followed except that only two layers were prepared. The bottom layer contains 25% hydroxyethyl cellulose (HEC) of high viscosity (HV) (4800 cp at 25° C. for 2% solution) and 75% urea-formaldehyde. The top layer contains 25% (HEC) of low viscosity (LV) (10 cp at 25° C. for 2% solution) in addition to other nutrients. Also, polyvinyl acetae at M.Wt 190,000 was used instead of 160,000. The chemical composition and mechanical properties are shown in Table 5.

EXAMPLE 35

The same procedure of example 26 was followed except that methyl cellulose (MC) of different molecular weights was used. Bottom layer contained 25% of high viscosity MC equal to 4000 cp at 25° C. for 2% solution. Middle layer contained 25% of medium viscosity MC equals to 1500 cp at 25° C. for 2% solution. Top layer contained 25% of low viscosity MC equal to 400 cp at 25° C. for 2% solution. Also, polyvinyl acetate of high molecular weight equals to 190,000 was used instead of 160,000. The chemical composition and mechanical properties are shown in Table 5.

paratus (fluorescent UV-condensation type) for Exposure of Non-Metallic Materials" using an Atlas UVCON (ultra-violet condensation screening device) weatherometer. The source of UV radiation is obtained by using eight FS-40-T12 fluorescent sun lamps in the UVCON weatherometer. The cycle used for the accelerated degradation weathering study was: 4 hours of UV at 60° C. and 4 hours of condensation at 40° C. The test was conducted at this cycle for two weeks. Mechanical properties such as tensile strength and percent elongation at break were measured on a standard film testing machine, Testometric 220D, an electronic tensile tester. The cross-head speed of the machine grips was 200 m/min. The test was run at room temperature of 25+1C on standard samples that were cut by a standard dumbbell shaped die. The samples exposed in the weatherometer were removed and tested every two days. Since the mechanical properties are strongly affected by the level of moisture, one set of the samples to be tested was removed from the weatherometer during the condensation cycle (wet samples) while another set of samples was removed during the UV cycle (dry samples). Table 3 show the results of the mechanical properties of the above prepared films upon accelerated aging.

It should be understood that the specification and examples are set forth by way of illustration and that various modifications and changes may be made without departing from the scope of the appended claims.

TABLE 5

| | | | | CHEMICAL COMPOSITION (%) | | | | | | | | | Coating Conc. | |
|---|---|---|---|---|---|---|---|---|---|---|---|---|---|---|
| Ex. No. | Layer | 25% of PVA M. Wt. | MC Type | HEC | U/F | $K_2HPO_4$ | $KH_2PO_4$ | Urea | $KNO_3$ | TEP | Starch | Cast. Sol. Conc. | PVAC*** (%) | VCC (%) |
| 34 | Bottom | — | — | 25(HV)* | 75 | — | — | — | — | — | — | 7.5 | 10 | — |
| | Top | — | — | 25(LV) | 40 | 12.5 | — | 7.5 | 10 | 5 | — | 10 | 5 | — |
| | Total | — | — | — | — | — | — | — | — | — | — | — | — | — |
| 35 | Bottom | — | 4000** | — | 75 | — | — | — | — | — | — | 7.5 | 10 | — |
| | Middle | — | 1500 | — | 40 | 15 | — | 5 | 10 | 5 | — | 5 | 5 | — |
| | Top | — | 400 | — | 40 | 10 | — | 10 | 10 | 5 | — | 7.5 | 5 | — |
| | Total | — | — | — | — | — | — | — | — | — | — | — | — | — |

| | | NPK | | | MECHANICAL PROPERTIES | | | |
|---|---|---|---|---|---|---|---|---|
| Ex. No. | Layer | N (g/m²) | $P_2O_5$ (g/m²) | $K_2O$ (g/m²) | Tens. Str. (%) | Elong. at Break (%) | Moisture (%) | Film Thickness (cm) |
| 34 | Bottom | 22.95 | 0.00 | 0.00 | — | — | — | — |
| | Top | 40.61 | 21.16 | 24.43 | — | — | — | — |
| | Total | 62.56 | 21.16 | 24.43 | 24.67 | 66.8 | — | 0.036 |
| 35 | Bottom | 22.95 | 0.00 | 0.00 | — | — | — | — |
| | Middle | 11.85 | 8.07 | 9.49 | — | — | — | — |
| | Top | 22.33 | 9.05 | 10.19 | — | — | — | — |
| | Total | 57.13 | 17.12 | 19.68 | 89.4 | 38.5 | — | 0.028 |

*Hydroxyethyl cellulose (HEC), high viscosity (HV) is 4800 cP at 25° C. for 2% solution. low viscosity (LV) is 10 cP at 25° C. for 2% solution.
**Methyl cellulose (MC), high viscosity is 4000 cP at 25° C. for 2% solution. medium viscosity is 1500 cP at 25° C. for 2% solution. low viscosity is 400 cP at 25° C. for 2% solution.
***PVAC is polyvinyl acetate with M. Wt. 190,000.

The mechanical properties of the multi-layer films, such as tensile strength and elongation, were measured according to ASTM standard D 882-75b. The dissolution rates were measured on samples that were placed on top of sand contained in compartments. The samples were irrigated daily. The samples were weighed before and after certain periods of time as shown in Table 2. The weight loss and N, P, and K analysis were then carried out.

Weathering studies on the above films were conducted according to ASTM G-53-77 "Recommended Practice for Operating Light and Water Exposure Ap-

What is claimed is:

1. A self-supporting, composite, degradable agricultural mulch film which comprises:
   (a) a first layer formed from a water-soluble synthetic resin and at least one releasable form of nitrogen admixed therein and at least one releasable plant nutrient in addition to nitrogen for providing an initial amount of nutrients to a plant during the preemergent and early emergent stage;
   (b) a second layer formed as an adherent coating on said first layer, said second layer comprising a water-soluble synthetic resin having an average molecular weight which is greater than the average molecular weight of the water soluble synthetic resin in said first layer and at least one releasable form of nitrogen admixed therein, and a water resistant polymer to retard the degradation rate of said second layer and to slow the rate of release of said nitrogen so that said second layer provides needed nutrients to a plant during the later stage of its growth.

2. A self-supporting, composite, degradable, agricultural film according to claim 1 in which the water-soluble synthetic resin in said first layer is a polyvinyl alcohol having an average molecular weight within the range of about 15,000 and about 72,000, and the water-soluble synthetic resin in said second layer is a polyvinyl alcohol having an average molecular weight within the range of about 49,000 and 100,000 and wherein the water-resistant polymer in said second layer is a polyvinyl acetate having an average molecular weight within the range of about 45,000 to about 190,000.

3. A self-supporting, composite, degradable agricultural mulch film which comprises:
(a) a first layer formed from a water-soluble synthetic resin and at least one releasable form of nitrogen admixed therein and at least one releasable plant nutrient in addition to nitrogen for providing an initial amount of nutrients to a plant during the preemergent and early emergent stage;
(b) a second layer formed as an adherent coating on said first layer, said second layer comprising a water-soluble synthetic resin having an average molecular weight which is greater than the average molecular weight of the water soluble synthetic resin in said first layer and at least one releasable form of nitrogen admixed therein, for providing the nutrients during the growth stage of the plant; and
(c) a third layer formed as an adherent coating on said second layer, said third layer comprising a water-soluble synthetic resin having an average molecular weight which is greater than the average molecular weight of the water soluble synthetic resin in said second layer and at least one releasable form of nitrogen admixed therein, and a water-resistant polymer to net and the degradation rate of said third layer to further slow the rate of release of said nitrogen and said plant nutrient other than nitrogen wherein said third layer provides needed nutrients to a plant during its flowering and fruiting stages.

4. A self-supporting, composite, degradable, agricultural mulch film, according to claim 3 in which said second layer includes at least one releasable plant nutrient in addition to nitrogen.

5. A self-supporting, composite, degradable, agricultural mulch film, according to claim 4 in which said third layer includes at least one releasable plant nutrient in addition to nitrogen.

6. A self-supporting, composite, degradable, agricultural mulch film, according to claim 3 in which said second layer includes a water-resistant polymer to retard the degradation rate of said second layer.

7. A self-supporting, composite, degradable, agricultural mulch film, according to claim 6 in which said water-soluble resin in each of said layers is polyvinyl alcohol.

8. A self-supporting, composite, degradable, agricultural mulch film, according to claim 7 in which the average molecular weight of the polyvinyl alcohol in said first layer ranges from about 15,000 to about 22,000.

9. A self-supporting, composite, degradable, agricultural mulch film, according to claim 8 in which the average molecular weight of the polyvinyl alcohol in said second layer ranges from about 22,000 to about 72,000.

10. A self-supporting, composite, degradable, agricultural mulch film, according to claim 9 in which said average molecular weight of the polyvinyl alcohol in said third layer ranges from about 72,000 to about 100,000.

11. A self-supporting, composite, degradable, agricultural mulch film, according to claim 3 in which said water-resistant polymer is polyvinyl acetate.

12. A self-supporting, composite, degradable, agricultural mulch film, according to claim 6 in which said water-resistant polymer is polyvinyl acetate and in which the source of nitrogen is a urea formalehyde condensate with a formaldehyde to urea ratio of about 2.5:1.

13. A self-supporting, composite, degradable, agricultural mulch film, according to claim 3 in which said first layer includes a source of phosphorous and potassium.

14. A self-supporting, composite, degradable, agricultural mulch film, according to claim 13 in which said source of nitrogen is selected from the group consisting of urea and urea-formaldehyde polycondensates.

15. A self-supporting, composite, degradable, agricultural mulch film, according to claim 14 in which said source of nitrogen is urea and in which said first layer includes a nitrification inhibitor.

16. A self-supporting, composite, degradable, agricultural mulch film, according to claim 13 in which said plant nutrient in addition to nitrogen is potassium phosphate.

17. A self-supporting, composite, degradable, agricultural mulch film, according to claim 3 in which said first layer includes starch and a fumigant.

18. A self-supporting, composite, degradable, agricultural mulch film, according to claim 12 in which said polyvinyl acetate has an average molecular weight within the range of about 45,000 to about 190,000.

19. A self-supporting, composite, degradable, agricultural mulch film, according to claim 13 in which said second layer includes a urea-formaldehyde polycondensate and potassium phosphate.

20. A self-supporting, composite, degradable, agricultural mulch film, according to claim 19 in which second layer includes starch.

21. A self-supporting, composite, degradable, agricultural mulch film, according to claim 19 in which said second layer includes an insecticide.

22. A self-supporting, composite, degradable, agricultural mulch film, according to claim 19 in which said second layer includes a pesticide.

23. A self-supporting, composite, degradable, agricultural mulch film, according to claim 13 in which said third layer includes a source of phosphorous and potassium.

24. A self-supporting, composite, degradable, agricultural mulch film, according to claim 23 in which said third layer includes ethylene-glycol.

25. A self-supporting, composite, degradable, agricultural mulch film, according to claim 23 in which said third layer includes starch.

26. A self-supporting, composite, degradable, agricultural mulch film, according to claim 23 in which said third layer includes a material selected from the group consisting of insecticides, pesticides, fungicides and mixtures thereof.

27. A self-supporting, composite, degradable, agricultural film, according to claim 2 in which said bottom layer includes about 5.10 grams of nitrogen per square meter, and said top layer includes about 12 grams of nitrogen, about 16 grams of $P_2O_5$ and about 16 grams of $K_2O$ per square meter, has a tensile strength of about 63 Kilograms per square centimeter, an elongation at break of about 39.5%, about 12.6% moisture, and a thickness of about 0.018 centimeters.

28. A self-supporting, composite, degradable, agricultural film, according to claim 1 in which the water-soluble synthetic resin in said first layer is a methyl cellulose.

29. A self-supporting, composite, degradable, agricultural film, according to claim 1 in which the water-soluble synthetic resin in said first layer is a hydroxyethyl cellulose.

30. A self-supporting, composite, degradable, agricultural mulch film, according to claim 10 in which said bottom layer includes between about 5 and about 38 grams of nitrogen per square meter, between about 0 and about 24 grams of phosphorous per square meter and between about 0 and about 32 grams of potassium per square meter; said middle layer includes between about 1 and about 28 grams of nitrogen per square meter, between about 4 and about 24 grams of phosphorous per square meter and between about 3 and about 31 grams of potassium per square meter; said top layer includes between about 3 and about 31 grams of nitrogen per square meter, between about 5 and about 32 grams of phosphorous per square meter and between about 6 and about 46 grams of potassium per square meter; and wherein said film has a total thickness of between about 0.010 and about 0.064 centimeters and wherein the polyvinyl alcohol resins in each of said layers have a degree of hydrolysis ranging from about 86 to about 89%.

31. A method for preparing a clear multi-layer nutrient containing degradable mulch film which comprises the steps of:
  (a) forming a solvent based solution comprising a water-resistant thermoplastic resin and an organic solvent;
  (b) casting a film from said solvent solution;
  (c) drying said film; and
  (d) forming an aqueous admixture comprising a water-soluble synthetic film-forming resin, and at least one nitrogenous constituent which functions as a releasable source of nitrogen;
  (e) coating the dried film resulting from step c with a layer of said aqueous admixture;
  (f) drying the coating applied in step e;
  (g) forming a second solvent based solution comprising a water-resistant thermoplastic resin and an organic solvent;
  (h) casting a relatively thin film from said second solvent based solution on top of the dried coating of step f;
  (i) drying said relatively thin film applied in step h; and
  (j) forming a second aqueous admixture comprising a water-soluble synthetic film-forming resin having an average molecular weight which is less than the average molecular weight of the water-soluble synthetic resin in step d, at least one nitrogenous constituent which functions as a releasable source of nitrogen, and at least one plant nutrient in addition to said nitrogenous constituent;
  (k) coating the dried film resulting from step i with a layer of said second aqueous admixture; and
  (l) drying the coating applied in step k to form a multi-layer nutrient containing degradable mulch film in which the release of nutrients is time controlled to meet the needs of a plant during its various stages of growth.

32. A method for preparing a clear multi-layer nutrient containing degradable mulch film in accordance with claim 31 wherein the water-resistant thermoplastic resin used in step (a) is selected from the group consisting of polyvinyl acetate, plasticized polyvinyl chloride, ethylene/acrylic acid copolymer, ethylene/ethylacrylate copolymer vinyl chloride copolymer and mixtures thereof.

33. A method for preparing a clear multi-layer nutrient containing degradable mulch film in accordance with claim 32 wherein the water-resistant thermoplastic resin is a polyvinyl acetate having an average molecular weight ranging from about 45,000 to about 190,000.

34. A method for preparing a clear multi-layer nutrient containing degradable mulch film in accordance with claim 31 wherein the water-soluble synthetic film forming resins in steps (d) and (j) are selected from the group consisting of polyvinyl alcohol, carboxy methyl cellulose, polymethyl acrylate, methyl cellulose, hydroxyethyl cellulose and mixtures thereof.

35. A method for preparing a clear multi-layer nutrient containing degradable mulch film in accordance with claim 33 wherein the water-soluble synthetic film forming resins in steps (d) and (j) are polyvinyl alcohol.

36. A method for preparing a clear multi-layer nutrient containing degradable mulch film in accordance with claim 31 wherein the water-resistant thermoplastic resin is a polyvinyl acetate having an average molecular weight ranging from about 45,000 to about 190,000 and wherein the water-soluble synthetic film forming resins in steps (d) and
  (j) are polyvinyl alcohol having average molecular weights between about 15,000 and about 100,000.

37. A method for preparing a clear multi-layer nutrient containing degradable mulch film which comprises the steps of:
  (a) forming a solvent based solution comprising a water-resistant thermoplastic resin and an organic solvent;
  (b) casting a film from said solvent solution;
  (c) drying said film; and
  (d) forming an aqueous admixture comprising a water-soluble synthetic film-forming resin, at least one nitrogenous constituent which functions as a releasable source of nitrogen;
  (e) coating the dried film resulting from step c with a layer of said aqueous admixture;
  (f) drying the coating applied in step (e);
  (g) forming a second solvent based solution comprising a water-resistant thermoplastic resin and an organic solvent wherein the concentration of water resistant resin is less than the concentration of the water-resistant resin in step a;
  (h) casting a relatively thin film from said second solvent based solution on top of the dried coating of step (f);
  (i) drying said relatively thin film applied in step (h); and (j) forming a second aqueous admixture comprising a water-soluble synthetic film-forming resin having an average molecular weight which is less than the average molecular weight of the water-soluble resin in step d and at least one nitrogeneous constituent which functions as a releasable source of nitrogen;

(k) coating the dried film resulting from step i with a layer of said second aqueous admixtures;

(l) drying the coating applied in step (k);

(m) forming a third solvent based solution comprising a water-resistant thermoplastic resin and an organic solvent, wherein the concentration of water-resistant resin is less than the concentration of the water-resistant resin in step g;

(n) casting a relatively thin film from said third solvent based solution on top of the dried coating of step (l);

(o) drying said relativelyi thin film applied in step (n); and (p) forming a third aqueous admixture comprising a water-soluble synthetic film-forming resin having an average molecular weight which is less than the average molecular weight of the second water-soluble synthetic resin in step (j), at least one nitrogeneous constituent which functions as a releasable source of nitrogen, and at least one plant nutrient in addition to said nitrogeneous constituent;

(q) coating the dried film resulting from step (o) with a layer of said third aqueous admixture; and, (r) drying the coating applied in step (q) to form a multi-layer nutrient containing degradable mulch film in which the release of nutrients is time controlled to meet the needs of a plant during its various stages of growth.

38. A method for preparing a clear multi-layer nutrient containing degradable mulch film in accordance with claim 37 wherein the water-resistant thermoplastic resin is a polyvinyl acetate having an average molecular weight ranging from about 45,000 to about 190,000, and wherein the water-soluble synthetic film forming resins in steps (d), (j), and (p) are polyvinyl alcohols having average molecular weights between about 15,000 and about 100,000.

39. A method for preparing a clear multi-layer nutrient containing degradable mulch film in accordance with claim 38 wherein the water-soluble synthetic film forming resin in step (d) has an average molecular weight within the range of about 72,000 to about 100,000, and the water-soluble synthetic film forming resin in step (j) has an average molecular weight in the range of about 22,000 to about 72,000, and the water-soluble synthetic film forming resin in step (p) has an average molecular weight in the range of about 15,000 to about 22,000.

40. A method for preparing a clear multi-layer nutrient containing degradable mulch film in accordance with claim 39 wherein said third admixture in step (p) includes a nitrification inhibitor.

41. A method for preparing a clear multi-layer nutrient containing degradable mulch film in accordance with claim 39 wherein said first, second, and third admixtures formed in steps (d), (j) and (p) each include a nitrogeneous constituent selected from the group consisting of urea, water-soluble urea-formaldehyde and mixtures thereof, and wherein the plant nutrient in addition to said nitrogeneous constituents is selected from the group consisting of phosphorous and potassium sources.

* * * * *